Patented Jan. 1, 1952

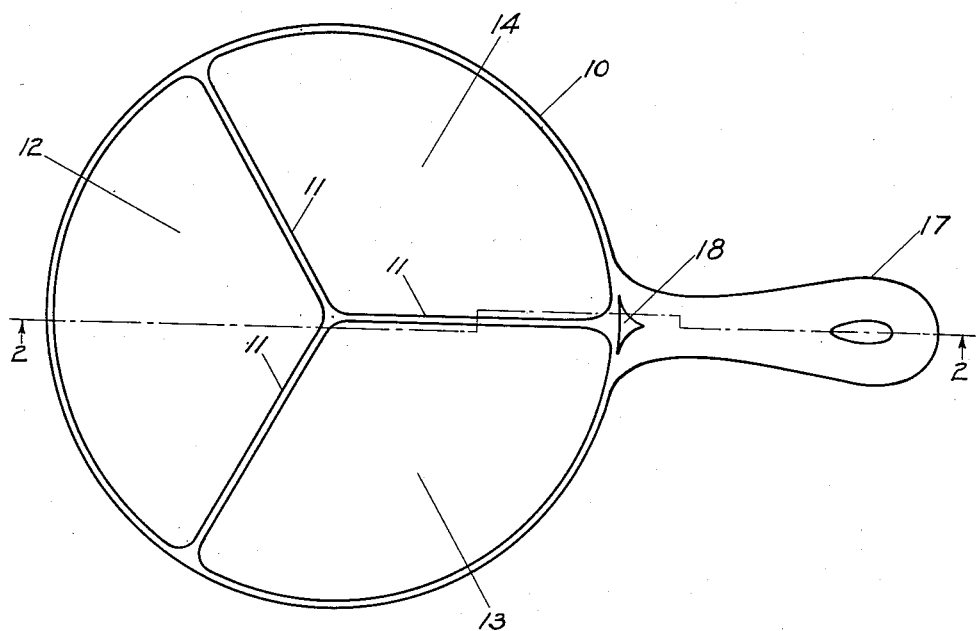
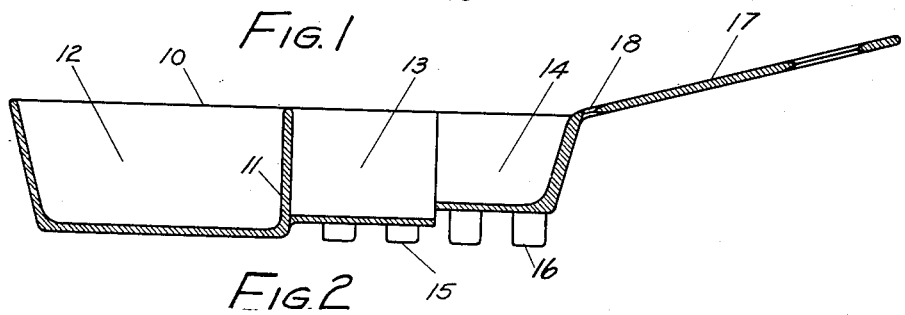

2,581,161

UNITED STATES PATENT OFFICE 2,581,161

COMPARTMENT FRYING PAN

Myrtle M. Anderson, Minneapolis, Minn.

Application April 10, 1947, Serial No. 740,528

2 Claims. (Cl. 126—390)

This invention relates to compartment frying pans, and particularly to such, as will provide different stages of heat in different compartments, so that victuals of varying requirements of heat, may be fried at the same time.

Frying pans with compartments have been made, but of different construction and with a different object in mind. Some have been made for frying eggs individually, so that eggs would not run together, and some with a central fountain for grease with channels to each of the compartments. There is still lacking a frying pan, with compartments to accommodate left over portions of different victuals, or small portions meeting requirements of light housekeeping and small apartment and trailer dwellers, and which will fry the different victuals differently and each one sufficiently, but not too much. To retain the characteristics and flavor of each of the victuals, it is necessary that same be in separate compartments. Where the portions are small, as in case of light housekeeping or in warming up leftovers, it obviously takes more than one pan to accommodate the different portions and for which burners and pans are not ordinarily available. Frequently, there is only a single burner or an electric plate to cook all foods on. To warm up or fry one victual at a time, takes too much time, so the first is cold by the time the last is done. The result is, that usually all victuals are heated together at the same time in a single space pan, with the outcome that none of the victuals taste right. Further, even though, different compartments are provided in a pan, different stages of heat are necessary, so that one victual requiring more heat, is insufficiently done, while another requiring less heat, is scorched.

One important object of my invention, is to provide a frying pan with compartments, which from a common source of heat, will transmit different stages of heat to the different compartments, so varying, that victuals most commonly consumed, may be fried in the different compartments at the same time and all be properly done.

Another important object of my invention, is to provide such compartment frying pan construction, so that the same results are attained, whether the pan be made of cast iron, pressed steel or pressed or cast aluminum. Gray iron may have a mixture of chrome steel, so it will not turn black. The pan might also be molded of nonmetallic materials, that have been developed to withstand heat.

Another object is to provide a frying pan, which although possessing the desirable features stated in the preceding objects may be cheaply manufactured.

Other objects will be apparent from the description and appended claims.

For a full disclosure of my invention, reference is made to the description following and to the drawings, in which—

Fig. 1 is a plan view of the pan of cast metal construction.

Fig. 2 is a cross sectional view on line 2—2 of Fig. 1.

In the selected embodiment of my invention, which is hereby disclosed, I provide a pan 10 of general shape of an ordinary frying pan, but with partitions 11 to form compartments. The compartments 12, 13 and 14 are of varying depths, to provide at the same time, different stages of heat for different kinds of victuals. Compartment 12 is full depth and in direct contact with heating source, so that it is suitable for meat and the like, which require a high degree of heat. Compartment 13 is somewhat shallower and separated from the heat source by a space, so that circulation of air carries away some of the intensity of the heat, and it is suitable for potatoes and the like, which require a medium degree of heat. Compartment 14 is still shallower and separated from the heat source by a still greater space, so that there is greater circulation of air, which carries away still more of the intensity of heat, and is suitable for creamed carrots and the like, which require a low degree of heat to prevent scorching. There may be more than three compartments, each with different degrees of heat, but three meets the requirements of the most common foods.

In the cast construction, bosses 15 and 16 provide support respectively under the sections of shallower construction, and allow circulation of air thereunder. The bosses are staggered to provide support on any kind of grill which may be effectively accomplished by arranging same in lines that are on the respective arcs of circles. The bosses 15 and 16 extend to the horizontal plane of the bottom surface of the compartment 12. The bosses, because of their staggered arrangement being adapted to engage any possible kind of grill structure, will cooperate with the full depth of section or compartment 12, to provide a stable support, since they are in the same horizontal plane. A handle 17 is provided, which has a space 18 to provide for dispersion of heat, so much of it will not creep into the handle. In this cast construction, the handle is cast integral with the pan, and the space 18 is provided in the casting.

Whether the cast construction or another construction, both common to frying pans, is employed, the same principles are involved. Sector shaped compartments are provided which have their tops in the same plane, but with bottoms at different elevations with respect to each other. A supporting structure, extending downwardly to the horizontal plane of the bottom surface of the lowest compartment, accordingly provides proper stable support for the other compartments. While the lowest compartment is in direct contact with the source of heat, the distance removed from said source, in the case of the others, accordingly reduces the amount of radiation and also increases the circulation of air according to the open areas of the structure to carry away the intensity of heat.

From the foregoing, it is apparent how the frying pan is shaped and constructed, and how frying of different kinds of food, requiring different degrees of heat, at the same time in the same pan, is made possible. To suit particular needs, it may be varied in shape, degrees of heat and material from which it is made. It will be noted, that there are no sharp corners within the compartments of the pan, all angular portions being smoothly curved, so that food is easily removed and so same may be easily cleaned and washed.

While I have shown and described a preferred form of my invention, it is obvious that many changes, which are within the scope of my invention, will be apparent to those skilled in the art. I therefore desire to be limited only by the scope of the appended claims.

What I claim is:

1. A frying pan, comprising a plurality of sector shaped compartments formed by radial partitions and a peripheral rim, the top edges of said partitions and the top edge of said rim lying in a common plane, a handle extending outwardly from the top edge of said peripheral rim, the bottoms of said compartments being at different elevations with respect to each other, each compartment except the lowest having a supporting structure extending downwardly below its bottom and varying in height for each compartment, so that the extremities extend to and are in the same plane as the bottom of said lowest compartment, to supportingly cooperate therewith to maintain stability of the pan, said supporting structure having an arrangement of open areas which are increased according to the height of each compartment above the lowest, providing accordingly decrease in radiation and increase in circulation of air to carry away intensity of heat, so that different stages of heat are provided in the different compartments according to intensity of heat permissible for the cooking of different foods.

2. A frying pan of integral cast construction, comprising a plurality of sector shaped compartments formed by radial partitions and a peripheral rim, the top edges of said partitions and the top edge of said rim lying in a common plane, a handle extending outwardly from the top edge of said peripheral rim, the bottoms of said compartments being at different elevations with respect to each other, each compartment except the lowest having a supporting structure extending downwardly below its bottom and varying in height for each compartment, so that the extremities extend to and are in the same plane as the bottom of said lowest compartment, to supportingly cooperate therewith to maintain stability of the pan, said supporting structure consisting of a plurality of integrally cast bosses of heights respectively to accommodate each compartment and positioned for distributive support, said supporting structure having an arrangement of open areas which are increased according to the height of each compartment above the lowest, providing accordingly decrease in radiation and increase in circulation of air to carry away intensity of heat, so that different stages of heat are provided in the different compartments according to intensity of heat permissible for the cooking of different foods.

MYRTLE M. ANDERSON.

REFERENCES CITED

The following references are of record in the file of this patent:

UNITED STATES PATENTS

| Number | Name | Date |
| --- | --- | --- |
| 867,086 | Sullivan | Sept. 24, 1907 |
| 1,522,329 | Salucci | Jan. 6, 1925 |
| 1,952,776 | Quinlan | Mar. 27, 1934 |
| 2,231,223 | Page | Feb. 11, 1941 |

FOREIGN PATENTS

| Number | Country | Date |
| --- | --- | --- |
| 399,462 | Great Britain | Dec. 30, 1931 |